H. O. JACKSON.
CHECK VALVE.
APPLICATION FILED JUNE 1, 1920.
Reissued Aug. 31, 1920.
14,943.
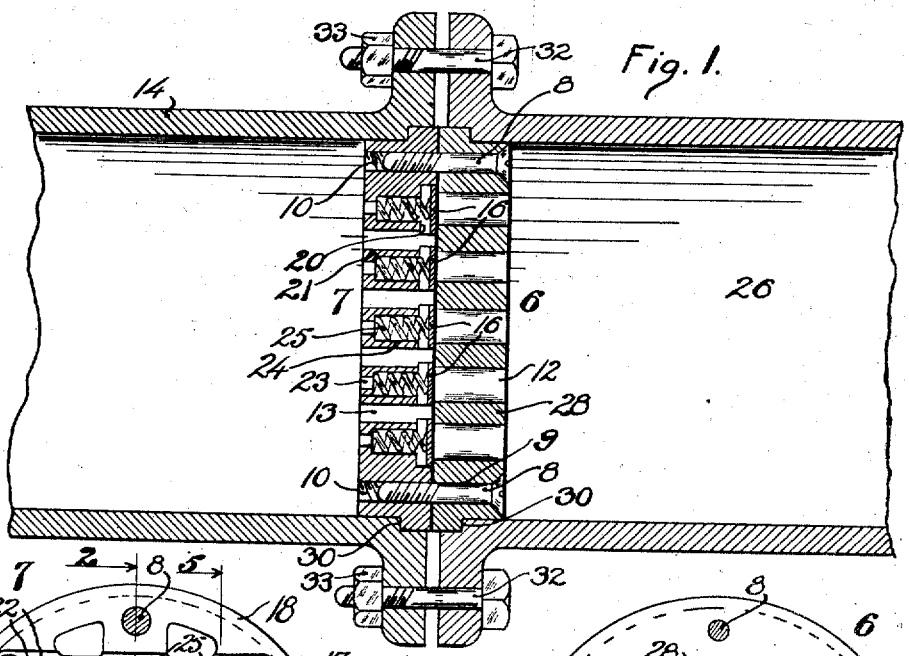
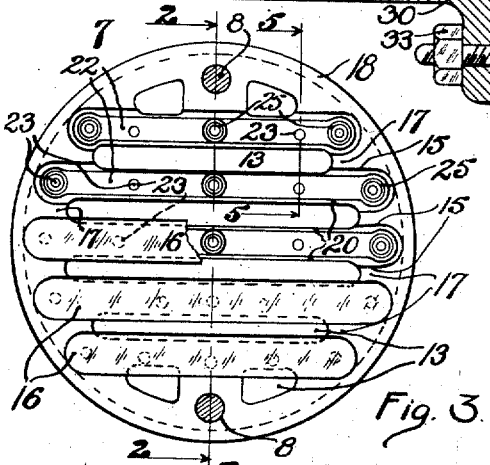
Fig. 3.
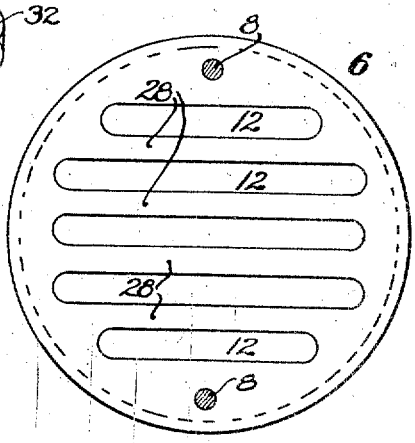
Fig. 4
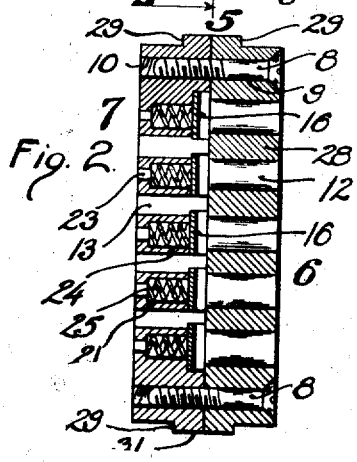
Fig. 2.
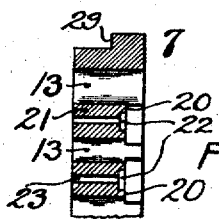
Fig. 5.
Inventor
H. O. Jackson.
By
Attorney

UNITED STATES PATENT OFFICE.

HENRY O. JACKSON, OF DENVER, COLORADO, ASSIGNOR TO THE JACKSON COMPRESSOR COMPANY, OF DENVER, COLORADO, A CORPORATION OF COLORADO.

CHECK-VALVE.

14,943. Specification of Reissued Letters Patent. Reissued Aug. 31, 1920.

Original No. 1,297,296, dated March 11, 1919, Serial No. 98,296, filed May 18, 1916. Application for reissue filed June 1, 1920. Serial No. 385,761.

*To all whom it may concern:*

Be it known that I, HENRY O. JACKSON, a citizen of the United States, residing at the city and county of Denver, State of Colorado, have invented certain new and useful Improvements in Check-Valves; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in check valves, my object being to provide a simple and economical device adapted to efficiently perform the aforesaid function. My present improvement is well adapted for use in connection with air compressors and is so constructed that it controls a port having a relatively large cross sectional area, thus distributing the pressure and therefore reducing the wear incident to this pressure to a large extent, whereby the efficient durability of the construction is greatly increased.

Generally speaking, my improved construction is composed of two relatively heavy casing members having staggered passages through which the air passes during the operation of a compressor, for instance. The passage of the air is controlled by means of thin, flat members which are adapted to cover the inlet passages of one casing member, being normally held in place and in the closed position by springs which act upon the said controlling devices to normally retain them in the seated position. These thin valve parts or pieces are long as compared with their width, and move bodily and equally throughout their entire length, their extremities engaging recesses formed in one of the casing members. The opposite member of the casing, and in which the inlet passages are formed, is smooth on its inner face, or that adjacent the recesses of the opposing casing member in which the valve pieces are arranged, the valve pieces, when seated in the recessed casing member, closing a series of ports which are in communication with the air pressure in the receiver, their object being to allow the back pressure in the receiver to act on the valve pieces with a tendency to maintain them normally in the closed position, or in position to close the inlet passage of the companion member except when the engine pressure acts upon said valve pieces. During the air compressing operation, for instance, the air passing through the inlet passages of the corresponding casing member, acts upon the relatively thin, flat, long, straight valve pieces, to force them away from the inlet passages and cause them to retreat into the recesses of the opposite casing member, thus allowing the air from each inlet passage to take a diagonal course and pass through the two staggered passages of the valve piece holding member.

Having briefly outlined my improvement, I will proceed to describe the same in detail, reference being made to the accompanying drawing, in which is illustrated an embodiment thereof. In this drawing:

Figure 1 is a central longitudinal section taken through a conduit in which my improved check valve is located and arranged in operative relation.

Fig. 2 is a central section of the valve shown in detail, the valve pieces, however, being shown in the open position as when the valve is used for air compressing purposes. This section may be indicated by the line 2—2 Fig. 3.

Fig. 3 is an inner face view of one of the members of the casing, being the one which I will term the valve piece holding part.

Fig. 4 is a similar view of the companion casing member.

Fig. 5 is a fragmentary section of the valve, the section being indicated by the line 5—5, Fig. 3.

The same reference characters indicate the same parts in all the views.

Let the numeral 5 designate my improved check valve considered in its entirety and consisting of two casing members 6 and 7, which, when the parts are assembled, are connected by means of screws 8 which pass through plain or unthreaded openings 9 in the member 6 and enter threaded openings 10 in the member 7. The member 6 may be termed the inlet member as it contains passages 12 which the air for instance, enters during the compressing operation; and the member 7 may be termed the exit member as it contains passages 13 which the air traverses on its way to the receiver, which passages 13 are continuously open to or in communication with the receiver or the conduit 14 between the check valve and the receiver (not shown). The passages 12 in the member 6 and the passages 13 in the member 7 are arranged in staggered relation, one set of passages being laterally offset from the other set as well illustrated in Figs. 1 and 2. The casing member 7 is provided with recesses 15 adapted to receive the opposite extremities of valve pieces 16, the recesses being shaped to conform with the outline of the corresponding valve pieces, but sufficiently large to allow these pieces to move freely therein as is required in order that they may properly perform their function. As illustrated in the drawing, the two casing members 6 and 7 are circular in shape in face view as indicated in Figs. 3 and 4. Hence, the various recesses 15 and their corresponding valve pieces 16, vary in length, the central recess 15 and its corresponding valve piece 16 being the longest, while the others diminish in length on opposite sides in both directions. As shown in the drawing, there are five of these valve pieces 16 and a corresponding number of recesses 15, though it must be understood that the invention is not limited to any precise or particular number of valve pieces and their corresponding recesses. Each recess 15 has a depth considerably greater than the thickness of its corresponding valve piece 16 in order to allow the latter an appreciable movement in the recess during the opening and closing action of the valve pieces, and in order to allow a free flow of fluid from the exit extremities of the inlet passages 12 to the inlet extremities of the exit passages 13. The valve pieces 16, as illustrated in the drawing, are composed of long narrow thin pieces of steel, their opposite edges being parallel between rounded or semi-circular extremities which correspond in shape with the ends of the recesses 15 which the valve pieces occupy. The recesses 15 are, properly speaking, formed only at the opposite ends of the valve pieces and are spaced by facing parts 17 which are flush with the flat circumferential face 18 of the casing member 7. Between any two areas 17 on opposite sides of the member 7, the face of the member is cut away flush with the faces 20 on opposite sides of the passages 13 so that the parallel edges of the valve pieces 16 for the greater part of their length, are located in space and not in engagement with walls as are their extremities which are adjacent the walls formed by the areas 17 of this member. Hence, the valve pieces when in the position shown in Fig. 2, overlap the passages 13 between the areas 17 on opposite sides and partly close these passages at their inlet extremities, as heretofore explained.

Between the two faces 20 of each partition 21 separating any two passages 13, the partition is provided with a shallow recess or cavity 22, whereby the back fluid pressure from the conduit 14 which acts through the ports 23 in the partitions 21, is free to act on the valve pieces 16 throughout the entire length of the latter when the valve pieces are in the open position or in engagement with the faces 20 of the partitions 21 or when the valve pieces are in the position shown in Fig. 2. Were it not for these shallow recesses 22 between the faces 20, the fluid pressure would act when the valve pieces are open as shown in Fig. 2, only on areas corresponding with the cross section of the ports 23. As shown in the drawing, several of these ports 23 are counterbored as shown at 24 to receive spiral springs 25, which act upon the valve pieces to normally hold them in the closed position shown in Fig. 1, this condition existing when the pressure is cut off from the inlet conduit 26. By virtue of these springs, the valve pieces will be held in the closed position, or that shown in Fig. 1, assuming that there is no pressure except normal atmospheric in either of the conduit members 14 or 26. The valve pieces are, by virtue of these springs, positively held in the closed position when there is no pressure in the inlet conduit 26, and caused to move uniformly throughout their length toward and away from their seats when the valve is used for air-compressing purposes.

As shown in the drawing (see Fig. 3) two of the valve pieces on the upper side of the casing member 7 are removed while the right-hand portion of the central valve piece is broken away. Hence, in this view the shallow recesses 22 are exposed by the removal of said valve pieces and by the breaking away of the other valve piece. Furthermore, as shown in the drawing, three of the ports 23 of each partition 21 of the casing member 7, are counterbored to receive springs 25, there being one of these springs at each extremity of each valve piece 16, and another spring 25 at the center of each valve piece. It is evident, however, that a greater or less number of these springs may be employed. Again, as shown in the drawing, and as best illustrated in Fig. 3, each partition 21 is provided with two ports 23 which are uncounterbored, and consequently of the same size or of the same cross sectional area throughout their length, but it is evident that the particular number of these ports is immaterial, so long as they are so arranged and of such size as to allow the back pressure from the receiver or from the conduit 14 to properly act upon the valve pieces in opposition to the pressure on the inlet side of the valve or on the side where the inlet conduit 26 is located.

The member 6 of the valve casing has its face 27 perfectly flat and all in a single plane. This inner face of the casing member 6 engages and fits closely against the areas 17 and the rim area 18 or the entire flat face portion of the inner surface of the member 7. This casing member 6 has its face broken only by the inlet passages 12 which are of the same area or approximately of the same area as the exit passages 13 of the member 7. The passages 12 are spaced by partitions 28 which correspond with the partitions 21 of the member 7.

When the valve is in use, it may be held in place between two conduit members 14 and 26 as shown in Fig. 1, the casing members 6 and 7 having shoulders 29 which are engaged by adjacent shoulders 30 formed on the two conduit members. In other words, the adjacent extremities of the two members are circumferentially recessed to receive a circumferential projection 31 formed on the valve casing, considering the latter in its entirety. The conduit members 14 and 26 as illustrated in the drawing, are connected by bolts 32 fastened by nuts 33, whereby the valve is securely held in coöperative relation with the conduit members.

From the foregoing description, the use and operation of my improved check valve will be readily understood. Assuming that it is positioned as shown in Fig. 1, and assuming that it is employed in connection with an air compressor, the air will enter the passages 12 of the casing member 6, and act upon the valve pieces 16, to force them away from the exit extremities of the passages 12, in opposition to the action of the spiral springs 25. The air will then pass first out of its course laterally and thence through the passages 13 of the casing member 7, into the conduit 14 which is in communication with the receiver (not shown).

Another object of the shallow grooves 22 in the faces of the partitions 21, is to reduce the capillary attraction incident to the coating of the inner faces of these partitions with oil. By forming the shallow grooves 22, the areas of these faces with which the valve pieces are actually in contact, are reduced to a minimum, and the resistance due to capillary attraction is negligible.

I claim:

1. A ribbon or plate valve, comprising united seat and cap sections forming a valve chamber between them and provided with port and flow slots respectively opening into said chamber, a substantially straight valve plate loosely confined in said chamber and serving to close the port slot, and spring-seating means loosely interposed between the valve plate and the cap section.

2. A ribbon or plate valve, comprising a ported seat section having the inner ends of its ports terminating at a common plane surface, a cap section secured to the seat section and forming a chamber therebetween loosely confining a straight, thin plate valve to close each port slot, and an unattached and unrestrained spring-seating means for each valve plate, and flow passages formed in said cap section communicating with said chamber, the metal between or adjacent said passages forming a backing support for the spring seating means.

3. A ribbon or plate valve comprising united seat and cap sections forming a valve chamber between them and provided with port and flow slots respectively opening into said chamber, a thin, straight valve plate of light mass serving to close the port slot, a uniformly flexing seating spring loosely interposed between the valve plate and the cap section, the said valve plate being loosely confined in the valve chamber and unattached to any part.

4. A ribbon or plate valve comprising united seat and cap sections forming a valve chamber between them and provided with port and flow slots respectively opening into said chamber, said seat section having a plain inner surface forming the valve seat, a straight thin valve plate of light mass loosely confined in said chamber and serving to close the port slot, and spring-seating means loosely interposed between the valve plate and the cap section, the port and flow slots being unobstructed throughout their length.

5. A ribbon or plate valve comprising united seat and cap sections forming a valve chamber between them and provided with port and flow slots respectively opening into said chamber, said seat section having a plain inner surface forming the valve seat, a thin, straight valve plate of light mass loosely confined to said chamber and serving to close the port slot, and spring-seating means loosely interposed between the valve plate and the cap section, the valve chamber being devoid of guides for the valve plates except at the extremities of the latter.

6. A check valve composed of a casing having a series of coöperating inlet and exit passages arranged in staggered relation, and relatively long, flat, thin valve pieces mounted to move bodily and substantially uniformly throughout their entire length, toward and away from the exit extremities of the inlet passages, the inner faces of the casing partitions between the exit passages having shallow recesses, and ports in communication with these recesses.

7. A check valve comprising a casing having a number of coöperating inlet and exit passages arranged in staggered relation, and relatively long, flat, thin valve pieces mounted to move bodily and substantially uniformly throughout their entire length, toward and away from the exit extremities of the inlet passages, the inner faces of the casing partitions between the exit passages having shallow recesses and ports in communication with these recesses, certain of the ports being counterbored, and spiral springs located in the counterbores of the said ports and acting on the valve pieces to move them normally into seated relation with the exit extremities of the inlet passages.

8. A check valve composed of a casing having inlet and exit passages arranged in staggered relation and spacing partitions with which the casing is provided, and valve pieces supported to move toward and away from the inner faces of the partitions separating the exit passages, the said faces being provided with shallow grooves, whereby the areas which said pieces are adapted to engage are reduced to a minimum, the said partitions being also provided with ports in communication at their inner extremities with said shallow grooves.

9. A check valve composed of a casing having a series of coöperating inlet and exit passages and relatively long, flat, thin valve pieces all mounted to move simultaneously and bodily and substantially uniformly throughout their entire length toward or away from the exit extremities of the inlet passages and to allow the air to travel through the valve in one direction only, the inner faces of the casing partitions between the exit extremities having shallow recesses, and ports in communication with these recesses.

In testimony whereof I affix my signature.

HENRY O. JACKSON.